(12) United States Patent
Aahlad et al.

(10) Patent No.: US 9,154,553 B2
(45) Date of Patent: Oct. 6, 2015

(54) METHODS, DEVICES AND SYSTEMS FOR DYNAMICALLY MANAGING MEMBERSHIPS IN REPLICATED STATE MACHINES WITHIN A DISTRIBUTED COMPUTING ENVIRONMENT

(71) Applicant: WANdisco, Inc., San Ramon, CA (US)

(72) Inventors: Yeturu Aahlad, Foster City, CA (US); Michael Parkin, San Ramon, CA (US); Naeem Akhtar, Dublin, CA (US)

(73) Assignee: WANdisco, INC., San Ramon, CA (US)

( * ) Notice: Subject to any disclaimer, the term of this patent is extended or adjusted under 35 U.S.C. 154(b) by 0 days.

(21) Appl. No.: 14/464,030

(22) Filed: Aug. 20, 2014

(65) Prior Publication Data

US 2015/0012583 A1    Jan. 8, 2015

Related U.S. Application Data

(62) Division of application No. 13/838,639, filed on Mar. 15, 2013, now Pat. No. 9,009,215.

(51) Int. Cl.
*G06F 17/00* (2006.01)
*H04L 29/08* (2006.01)

(52) U.S. Cl.
CPC .................................. *H04L 67/1095* (2013.01)

(58) Field of Classification Search
USPC .................................. 709/201–204, 217–224
See application file for complete search history.

(56) References Cited

U.S. PATENT DOCUMENTS

| 7,185,076 | B1 | 2/2007 | Novaes |
| 7,400,596 | B1 | 7/2008 | Robertson et al. |
| 7,765,186 | B1 | 7/2010 | Hu et al. |
| 7,788,522 | B1 | 8/2010 | Abdelaziz et al. |
| 7,849,223 | B2 | 12/2010 | Malkhi |
| 8,458,239 | B2 | 6/2013 | Ananthanarayanan et al. |
| 8,489,549 | B2 | 7/2013 | Guarraci |
| 8,732,648 | B2 | 5/2014 | Suaya |
| 9,009,215 | B2 * | 4/2015 | Aahlad et al. ................. 709/202 |
| 2004/0034822 | A1 | 2/2004 | Marchand |
| 2004/0172421 | A1 | 9/2004 | Saito et al. |
| 2004/0221149 | A1 | 11/2004 | Rao et al. |

(Continued)

FOREIGN PATENT DOCUMENTS

| CN | 102999633 A | 3/2013 |
| CN | 103458044 A | 12/2013 |

OTHER PUBLICATIONS

International Search Report and Written Opinion in PCT/US13/63422, dated Apr. 21, 2014.

(Continued)

*Primary Examiner* — Jude Jean Gilles
(74) *Attorney, Agent, or Firm* — Young Law Firm, P.C.

(57) ABSTRACT

A computer-implemented method may comprise processing agreements received over a computer network at a first replicated state machine deployed on processes belonging to a first membership in an order defined by a first globally ordered set of agreements associated with the first membership; receiving an agreement to change membership that is configured to cause the first replicated state machine to be deployed on processes belonging to a second membership that is associated with a second globally ordered set of agreements; and processing the agreement to change membership at a point within the first globally ordered set of agreements.

9 Claims, 4 Drawing Sheets

(56) References Cited

U.S. PATENT DOCUMENTS

| | | | |
|---|---|---|---|
| 2005/0086384 A1 | 4/2005 | Ernst | |
| 2005/0283644 A1 | 12/2005 | Lorch et al. | |
| 2006/0143517 A1 | 6/2006 | Douceur et al. | |
| 2006/0155729 A1 | 7/2006 | Aahlad et al. | |
| 2006/0203837 A1 | 9/2006 | Shvodian | |
| 2006/0235889 A1* | 10/2006 | Rousseau et al. | 707/104.1 |
| 2007/0189249 A1 | 8/2007 | Gurevich et al. | |
| 2008/0036472 A1 | 2/2008 | Collins et al. | |
| 2008/0133741 A1 | 6/2008 | Kubota | |
| 2009/0150566 A1 | 6/2009 | Malkhi et al. | |
| 2010/0153282 A1* | 6/2010 | Graham | 705/310 |
| 2010/0180146 A1 | 7/2010 | Rousseau et al. | |
| 2010/0188969 A1 | 7/2010 | Kim | |
| 2010/0333166 A1 | 12/2010 | Herrod | |
| 2011/0066296 A1 | 3/2011 | Nelson | |
| 2011/0107358 A1 | 5/2011 | Shyam et al. | |
| 2011/0302449 A1 | 12/2011 | Douceur et al. | |
| 2012/0101991 A1 | 4/2012 | Srivas et al. | |
| 2012/0130950 A1 | 5/2012 | Jain et al. | |
| 2012/0204139 A1 | 8/2012 | Suaya et al. | |
| 2012/0254412 A1 | 10/2012 | Goose et al. | |
| 2014/0059310 A1 | 2/2014 | Du et al. | |
| 2014/0074996 A1 | 3/2014 | Bortnikov et al. | |
| 2014/0164262 A1* | 6/2014 | Graham | 705/310 |
| 2014/0181262 A1 | 6/2014 | Goswami et al. | |
| 2014/0195558 A1 | 7/2014 | Murthy et al. | |
| 2014/0330787 A1 | 11/2014 | Modukuri et at | |

OTHER PUBLICATIONS

USPTO Office Action of Dec. 19, 2014 in related U.S. Appl. No. 13/837,366.
Notice of Allowance dated Jan. 29. 2015 in related U.S. Appl. No. 13/838,639 and Lists of References cited by applicant and considered by examiner.
USPTO Office Action of Feb. 5, 2015 in related U.S. Appl. No. 13/835,888.
USPTO Notice of Allowance of Jan. 29, 2015 in related U.S. Appl. No. 13/838,639.
USPTO Office Action in U.S. Appl. No. 14/041,894 dated Jun. 3, 2015.
USPTO Office Action in U.S. Appl. No. 14/013,948 dated May 22, 2015.
International Preliminary Report on Patentability of Jul. 9, 2015 in PCT application PCT/US2013/063422.
International Preliminary Report on Patentability of Jul. 9, 2015 in PCT application PCT/US2013/063454.
International Search Report and Written Opinion of Jun. 25, 2015 in PCT application PCT/US2015/18680.
Office Action of Jun. 24, 2015 in U.S. Appl. No. 13/837,366.
Office Action of Jun. 25. 2015 in U.S. Appl. No. 12/069,986.
Geo-replication, downloaded from http://searchwindowsserver.techtarget.com/definition/geo-replication on Mar. 4, 2014.
Amazon Simple Storage Service Developer Guide API Version Mar. 1, 2006, downloaded from http://awsdocs.s3.amazonaws.com/S3/latest/s3-dg.pdf on Mar. 4, 2014.
International Search Report and Written Opinion in PCT/US13/63454, dated Apr. 18, 2014.
International Search Report and Written Opinion in PCT/US14/10451, dated Aug. 5, 2014.
Wiki Amazon S3, downloaded from http://en.wikipedia.org/wiki/Amazon_S3 on Mar. 4, 2014.
Introducing Geo-replication for Windows Azure Storage, Sep. 15, 2011 1:27 PM, downloaded from http://blogs.msdn.com/b/windowsazurestorage/archive/2011/09/15/introducing-geo-replication-for-windows-azure-storage.aspx on Mar. 4, 2014.
Google Cloud Storage Overview, downloaded from https://developers.google.com/storage/docs/overview on Mar. 4, 2014.
Cloudera Backup and Disaster Recovery, downloaded from https://www.cloudera.com/content/cloudera-content/cloudera-docs/CM4Ent/latest/Cloudera-Backup-Disaster-Recovery/Cloudera-Backup-Data-Recovery.html on Mar. 4, 2014.
What is Hadoop?>> Apache Falcon Apache Falcon A framework for managing data processing in Hadoop Clusters, downloaded from http://hortonworks.com/hadoop/falcon/ on Mar. 4, 2014.
MapR Disaster Recovery Scenario Data+Protection, Peter Conrad, last edited by Anne Leeper on Feb. 22, 2014, downloaded from http://doc.mapr.com/display/MapR/Data+Protection#DataProtection-Disaster-RecoveryScenario:DisasterRecovery on Mar. 4, 2014.
Hadoop HDFS HDFS-5442 Zero loss HDFS data replication for multiple datacenters, The Apache Software Foundation, Created: Oct. 29, 2014 13:11 Updated: Jan. 10, 2014 08:13, downloaded from https://issues.apache.org/jira/browse/HDFS-5442 on Mar. 4, 2014.
Disaster Recovery Solution for Apache Hadoop Contributors: Chen Haifeng (haifeng.chen@intel.com), Gangumalla Uma (uma.gangumalla@intel.com), Dey Avik (avik.dey@intel.com), Li Tianyou (tianyou.li@intel.com), Purtell, Andrew (andrew.k.purtell@intel.com), downloaded from https://issues.apache.org/jira/secure/attachment/12620116/Disaster%20Recovery%20Solution%20for%20Hadoop.pdf on Mar. 4, 2014.
Spanner: Google's Globally-Distributed Database, James C. Corbett, Jeffrey Dean, Michael Epstein, Andrew Fikes, Christopher Frost, JJ Furman, Sanjay Ghemawat, Andrey Gubarev, Christopher Heiser, Peter Hochschild, Wilson Hsieh, Sebastian Kanthak, Eugene Kogan, Hongyi Li, Alexander Lloyd, Sergey Melnik, David Mwaura, David Nagle, Sean Quinlan, Rajesh Rao, Lindsay Rolig, Yasushi Saito, Michal Szymaniak, Christopher Taylor, Ruth Wang, and Dale Woodford, downloaded from http://research.google.com/archive/spanner.html on Mar. 4, 2014.
Transactional storage for geo-replicated systems Yair Sovran, Russell Power, Marcos K. Aguilera, Jinyang Li, downloaded from http://research.microsoft.com/en-us/people/aguilera/walter-sosp2011.pdf on Mar. 4, 2014.
Stronger Semantics for Low-Latency Geo-Replicated Storage, Wyatt Lloyd, Michael J. Freedman, Michael Kaminsky, and David G. Andersen, To appear in Proceedings of the 10th USENIX Symposium on Networked System Design and Implementation (NSDI'13), Lombard, IL, Apr. 2013, downloaded from http://sns.cs.princeton.edu/docs/eiger-nsdi13.pdf on Mar. 4, 2014.
CSPAN: Cost-Effective Geo-Replicated Storage Spanning Multiple Cloud Services, Zhe Wu, Michael Butkiewicz, Dorian Perkins, Ethan Katz-Bassett, Harsha V. Madhyastha, downloaded from http://conferences.sigcomm.org/sigcomm/2013/papers/sigcomm/p545.pdf on Mar. 4, 2014.

\* cited by examiner

METHODS, DEVICES AND SYSTEMS FOR DYNAMICALLY MANAGING MEMBERSHIPS IN REPLICATED STATE MACHINES WITHIN A DISTRIBUTED COMPUTING ENVIRONMENT

CROSS-REFERENCE TO RELATED APPLICATIONS

The present application is a Divisional of co-pending and commonly-owned U.S. patent application Ser. No. 13/838,639 filed on Mar. 15, 2013, which application is incorporated by reference herein in its entirety.

BACKGROUND

In a distributed computing system of processes hosting replicated state machines, it may be desired to change the association of a state machine to a collection of processes that participates in the operation of the state machine.

DETAILED DESCRIPTION

Definitions

Distributed system: A distributed system comprises a collection of distinct processes that may be spatially separated, and that may communicate with one another through the exchange of messages.

Replicated State machine: A replicated state machine approach is a method for implementing a fault-tolerant service by replicating servers and coordinating client interactions with server replicas. These state machines are "replicated" since the state of the state machine evolves identically at all learners. Replicas of a single server are executed on separate processors of a distributed system, and protocols are used to coordinate client interactions with these replicas. One example and implementation of a replicated state machine is a deterministic state machine that consumes its state in a deterministic manner.

Global sequence of agreements: In the state machine approach, requests are processed by the state machine one at a time, in an order that is consistent. Therefore, for the replicas of the state machine to remain consonant with each other, a globally agreed-upon sequence of commands is necessary to ensure the same sequence of commands is replayed in the same order on each replica. According to one embodiment, the processing and delivery of the agreements to a replicated state machine may be decoupled from the proposing aspect thereof through the implementation of a separate queue, and the global sequence of agreements may be delivered to the replicated state machine through a concept called the output proposal sequence. The global sequence of agreements delivered by the output proposal sequence to the software application (e.g., a software version control system) may, according to one embodiment, be totally ordered by a key, $k_{last\_output}$ (which may be implemented, according to one embodiment, as a monotonically incrementing integer).

Distributed agreement/co-ordination engine: One embodiment calls for an agreement or co-ordination engine to generate the global sequence of agreements necessary to achieve consistent replicas of state machines. An exemplary co-ordination engine is described in commonly assigned and co-pending U.S. patent application U.S. application Ser. No. 12/069,986 filed on Feb. 13, 2008, which is incorporated herein by reference in its entirety. According to one embodiment, however, a co-ordination engine used for dynamic membership may support unique agreement identities that contain the identity "d" of the replicated state machine under which an agreement was made, the identity of the membership "m" under which the agreement was made and a unique key "k" of the agreement, which unique key k corresponds, according to one embodiment, to the position occupied by the agreement in the global sequence of agreements. According to one embodiment, therefore, d, m and k enable uniquely identifying each agreement made by the agreement engine for a replicated state machine d, under the membership m, the agreement key k. Herein, the agreement identity is denoted as the triple <d, m, k>.

Non-blocking: Herein, the term 'non-blocking' refers to the capability of a set of processes to remain fully or partly available while changes are made to that set.

Proposers: According to one embodiment, proposers are processes that are configured and enabled to suggest changes (i.e., to make proposals) to the future state of the replicated state machine. In embodiments comprising a replicated software version control system, proposers may be those processes that are allowed to make changes to the software repositories managed by the system.

Acceptors: According to one embodiment, acceptors are processes that are configured to participate in deciding on the order of proposals made by proposers. According to one embodiment, only when a majority of acceptors have determined that a proposal takes a particular place in the global sequence of agreements does it become agreed. As acceptors, according to one embodiment, may be configured to only participate in deciding on the order of agreements and do not reason/care about the underlying contents of the agreements (as described herein, the agreement's value is opaque to the agreement/co-ordination engine). Acceptors may be configured as application-independent entities.

Learners: According to one embodiment, learners learn of agreements made between the proposers and acceptors and apply the agreements in a deterministic order to the application through their output proposal sequence. In embodiments comprising a replicated software version control system, learners may comprise those processes that are configured to host a replica of the software repositories managed by the system.

Membership: A membership specifies a set of nodes or processes, and the roles each plays within the specified set of nodes. According to one embodiment, a membership suitable for use in dynamic memberships according to embodiments may comprise as a set of acceptors, a set of proposers and a set of learners.

Described herein are embodiments for enabling and achieving dynamic membership changes of a replicated state machine that allows non-blocking (i.e., the system is always available), flexible (arbitrary processes can be removed and added to the membership) and deterministic (the same changes will happen on all nodes at the same point in the operation of the replicated state machine) membership changes, even in the presence of asynchronous and out-of-order delivery of agreements to the process by a distributed co-ordination engine and without resorting to throughput-degrading measures such as the proposal of state machine null operations.

Accordingly, one embodiment enhances the global sequence of agreements, such as that described and claimed in the aforementioned US patent application U.S. application Ser. No. 12/069,986 with support for dynamic membership changes and for selective association of roles to nodes in the distributed computing environment. According to one embodiment, an agreement identity is provided, as is a persistent store that, for each replicated state machine, allows a sequence of agreements for each membership to be persistently recorded. The persistent store, according to one embodiment, maps the identity of the membership under which the agreements were made with keys that are tuples of the agreement's key, k, and associated value, e. Therefore, according to one embodiment, the agreement handler for each replicated state machine may be configured to maintain multiple sequences of agreements for multiple memberships at once and, at the appropriate point in the global sequence of agreements, switch between them.

Proposals, Agreements and Agreement Handling

Before detailing components of one embodiment of dynamic membership and the manner in which such components interact, the concept of a proposal is explained, including what information a proposal contains, how a proposal may become an agreement and how the agreement handler processes agreements. With these concepts in hand, embodiments for achieving non-blocking, flexible and deterministic dynamic memberships will be set out. According to one embodiment, the dynamic membership functionality may be implemented in parallel across multiple (e.g., 1000's) of replicated state machines, as embodiments are not limited to a single instance. As described above and according to one embodiment, this parallelism may be achieved with each agreement comprising the agreement identity <d, m, k>. That is, a replicated state machine d is correlated to m, the membership under which the agreement was made, and k, the agreement's unique key for that membership.

According to one embodiment, the proposal, agreement and agreement handling mechanism for a single replicated state machine may be carried out as follows, and repeated as desired for any number of a multiplicity of replicated state machines. The embodiment hereunder is described with respect to a single replicated state machine; the d in the triplet <d, k> will be left out.

Initially, a process n that is allowed to suggest changes to the state of the replicated state machine (a proposer) constructs a proposal e and submits it to the replicated state machine d. The replicated state machine d need not interpret the proposal e in any way; i.e., the proposal e may be opaque to d.

The replicated state machine d constructs agreement identity <d, m, k> as follows:
  d is its own identity;
  m is the identity of the membership with which it is currently associated;

k is the next viable key; for example, a natural number, one higher than the biggest of:
  a. the largest x of agreements reached, <d, m, x>
  b. the largest y of agreements to which d has proposed under membership m, <d, m, y>.

Once constructed, the proposal e is persistently stored by the state machine in a data structure that stores the proposal according to the membership key and value e. That is, each proposal may be uniquely identified using the triple <m, k, e>.

Once stored, the proposal may be submitted to the agreement instance identified by <d, m, k>.

Figure 1:
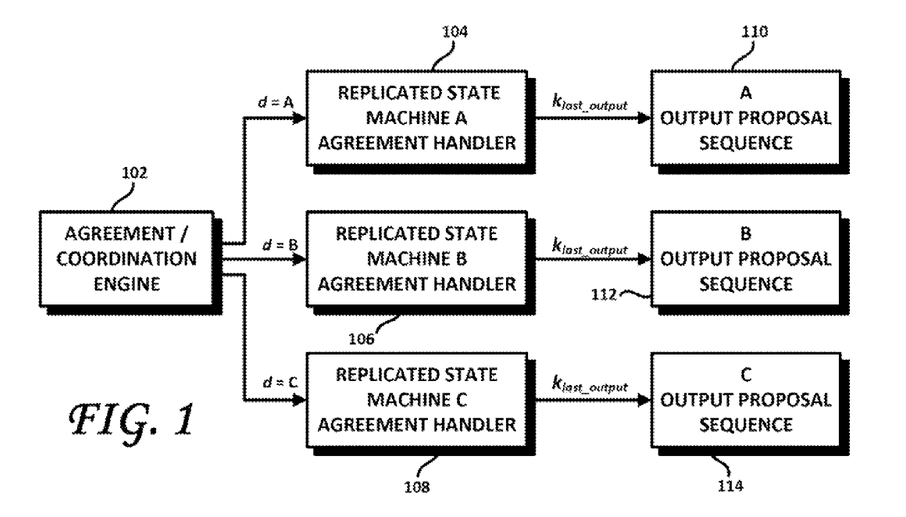
FIG. 1 is a block diagram showing an agreement/co-ordination engine delivering agreements to an agreement handler of each replicated state machine, according to one embodiment.

Once the proposal has been submitted to the agreement instance identified by <d, m, k>, the membership m agrees, via the agreement/co-ordination engine, that the proposal should or should not be the agreement in the $k^{th}$ position in the global sequence of agreements. If the proposal is agreed, it becomes an agreement within the agreement identity <d, m, k> and may be delivered by the agreement/co-ordination engine to the agreement handler of replicated state machine d and (eventually) to the output proposal sequence for d. This sequence is shown in FIG. 1 for three replicated state machines; namely, A, B and C. Indeed, FIG. 1 is a block diagram showing an agreement/coordination engine 102 delivering agreements to agreement handler of each replicated state machine, which processes and orders the agreements for delivery to respective output proposal sequences. As shown, an agreement is delivered by agreement/coordination engine 102 to replicated state machine A (d=A) 104, to replicated state machine B (d=B) 106 and to replicated state machine C (d=C) 108, which process and order the agreements for delivery to respective output proposal sequences 110, 112 and 114, ordered according to key $k_{last\_output}$.

Duplication of agreed events to the handler may, for example, be avoided by sharing a transactional commit between the agreement/coordination engine 102 and the agreement handler 104, 106, 108 (although duplication of agreed events may be avoided in other ways as well). However, because the distributed processes are autonomous and asynchronous and the processes involved in the agreement process may run at different rates, the agreement/coordination engine 102 may be configured to deliver agreements to the agreement handlers 104, 106, 108 out-of-order. The agreement handlers 104, 106, 108 of the replicated state machines, therefore, may be configured to maintain the variable $k_{last\_output}$, which may be defined as the value of k that was last given to the output proposal sequence to mediate between agreement handlers 104, 106, 108 and the respective output proposal sequences 110, 112, 114.

Agreement Handling without any Membership Changes

Agreement handling may comprise logic to determine what action to take depending on the observed key k of the agreement. The logic of the manner in which agreements may be processed, according to one embodiment, is described hereunder.

The global, totally ordered set of agreements for membership m delivered to the output proposal sequence may be represented as the set of agreements $A_m = \{a_1, \ldots, a_k\}$ where the agreement key k may belong, according to one embodiment, to the set of natural numbers (i.e., $\{\forall k: k \in N\}$).

Each agreement in the output proposal sequence, $\alpha_k$, has the identity <d, m, k> where d is the identity of the replicated state machine and m is the identity of the membership under which the agreement was agreed. However, according to one embodiment, the agreement engine may deliver agreements to the replicated state machine's agreement handler in a non-deterministic order and the agreement handler may, therefore, be responsible for placing agreements on the output proposal sequence in the correct order. To do this, upon observing an agreement delivered from the agreement/co-ordination engine, the agreement handler may, according to one embodiment, extract k, the agreement's key, and process it according to the following logic:

If $k<k_{last\_output}$ the agreement is invalid for this current sequence.

If $k=k_{last\_output}$ the agreement is marked as ready for processing.

If $k>k_{last\_output}$ the agreement is (persistently) enqueued for later delivery to the output proposal sequence.

Figure 2:
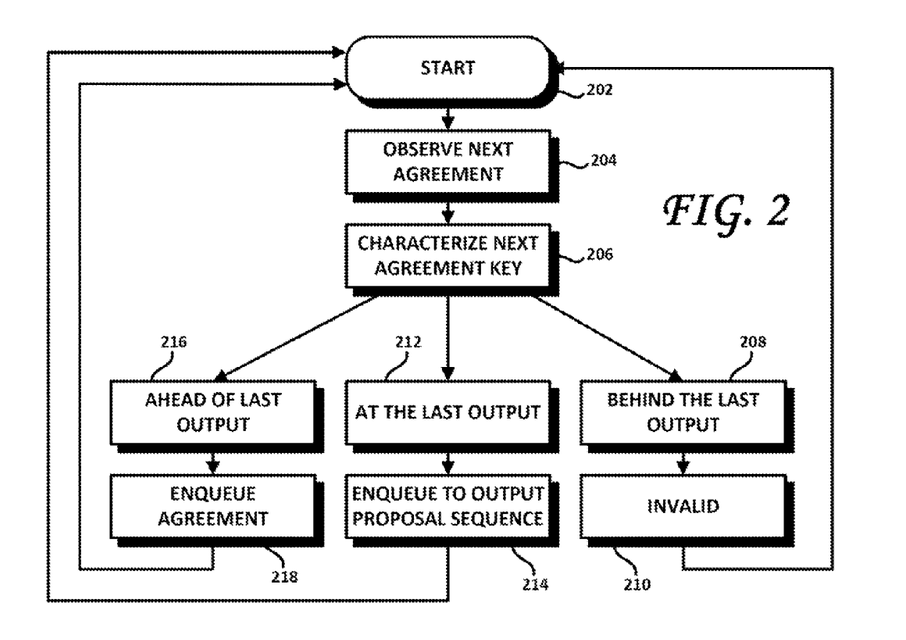
FIG. 2 is a diagram showing agreement handling, assuming no membership changes, according to one embodiment.

FIG. 2 is a diagram showing agreement handling, assuming no membership changes, according to one embodiment. As shown therein, the agreement handling process may begin at 202, whereupon the agreement handler may observe and characterize the next agreement (i.e., one of $\{a_1, \ldots, a_k\}$) at 204. The characterization may, according to one embodiment be based upon a comparison of the received agreement key k relative to the current agreement key or $k_{last\_output}$. If the received key k is behind the last output as shown at 208, it is de facto invalid as shown at 210, as being older than the current agreement key $k_{last\_output}$. If the received key is at (equal to) the current key as shown at 212, it is enqueued in the output proposal sequence, as shown at 214. If, however, the received key k is ahead of the last output (greater than the current key $k_{last\_output}$), as shown at 216 it may be simply enqueued in the agreement sequence as shown at 218 until such time as the its key k is equal to the current key $k_{last\_output}$, at which time it may be enqueued into the output proposal sequence. The process may then return to 202, to wait for receipt of the next agreement.

Agreement Handling with Dynamic Membership

According to one embodiment, the values agreed are opaque to the agreement/co-ordination engine 102. According to one embodiment, therefore, an agreement to change a replicated state machine's membership is 'just another agreement' and may take place at any point in the global sequence of agreements made under a particular membership. Accordingly, no special types of state machines or handlers are required to perform a membership change. It is to be noted, however, that a global sequence of agreements and the constituent agreements thereof, are only associated with the membership under which they arose.

In view of the foregoing, therefore, because agreements are received asynchronously and may be received out of order, a process may construct, and have agreed, a proposal with an agreement key k' greater than the key of an agreed membership change, k. The set of agreements with an agreement key k' greater than the key k of the membership change (i.e., the set of agreements defined by $\{\exists a_k \epsilon A : k'>k\}$), therefore, become invalid agreements following the processing of agreement $a_k$, as they were made under a membership not associated with the replicated state machine after $a_k$ is processed.

Because agreements may, according to one embodiment, be delivered to a replicated state machine's agreement handler in a non-deterministic order, agreements made under the next membership (and the membership after that, etc.) may be provided to the agreement handler before the membership itself changes. That is, one or more agreements made under a new membership may be delivered to an agreement handler that is still processing agreements made under the old membership.

As detailed above and according to one embodiment, the agreement engine may guarantee that for the same replicated state machine, no two agreements are ever issued for the state machine d with the same global sequence number k for the same membership m—i.e., the agreement identifier <d, m, k> must be unique.

As, according to one embodiment, the deterministic operation of the deterministic state machine can only be achieved if the deterministic state machine only outputs proposals agreed under its current membership, the above desirable property may be achieved by making all agreements made and observed for the current membership m with k'>k invalid, as such agreements took place under the old membership. For such proposals to be agreed, they must be re-proposed and agreed under the new membership m'. However, such proposals (agreements made and observed for the current membership m with k'>k) need not be re-proposed. If such proposals are not re-proposed under the new membership m', they can never be agreed upon and thus may be ignored.

As agreements, according to one embodiment, may be made at different rates by different processes, events made under the next/new membership (m') may arrive at another process before the agreement to change membership arrives at that same process. Therefore, the agreement handler may be configured to remember the agreements made under m'. In this manner, the agreements made under m' may be delivered to the output proposal sequence after the membership change (from in to m') is agreed, even if the process receiving the agreement doesn't (yet) know when that membership change will occur.

According to one embodiment, this may be achieved by the agreement handler of each replicated state by persisting the agreements in a store that is a map of the membership identity under which the agreement was made with keys that are tuples of the agreement's key, k, and associated value, e. In this manner, the agreement handler of each replicated state machine may simultaneously maintain multiple sequences of agreements for multiple memberships.

Dynamic Membership Formalism

According to one embodiment, the agreement engine delivers an agreement with identity <d, m, k> to change the membership of replicated state machine d from in to m' at position k in the global sequence of agreements to the agreement handler. The agreement handler processes the delivered agreement at the correct point in the global sequence of agreements. According to one embodiment:

Each process invalidates the set of agreements with an agreement key greater than the key of the membership change proposal (i.e., the set of agreements that satisfy $\{\exists a_k \epsilon A:k'>k\}$) and those agreements may be re-proposed by the original proposer to into ensure that the re-proposal occurs only once. If the original proposer does not have the role of proposer in the new membership m' these agreements, according to one embodiment, may be discarded and are not re-proposed by other proposers.

If the process is not a learner in the new membership m', then it should also uninstall the replicated state machine d (including the output proposal sequence so the application cannot learn of any new agreements).

If the process is not an acceptor in the new membership m', then it should no longer participate in the operation of the replicated state machine and remove any references thereto.

Figure 3:
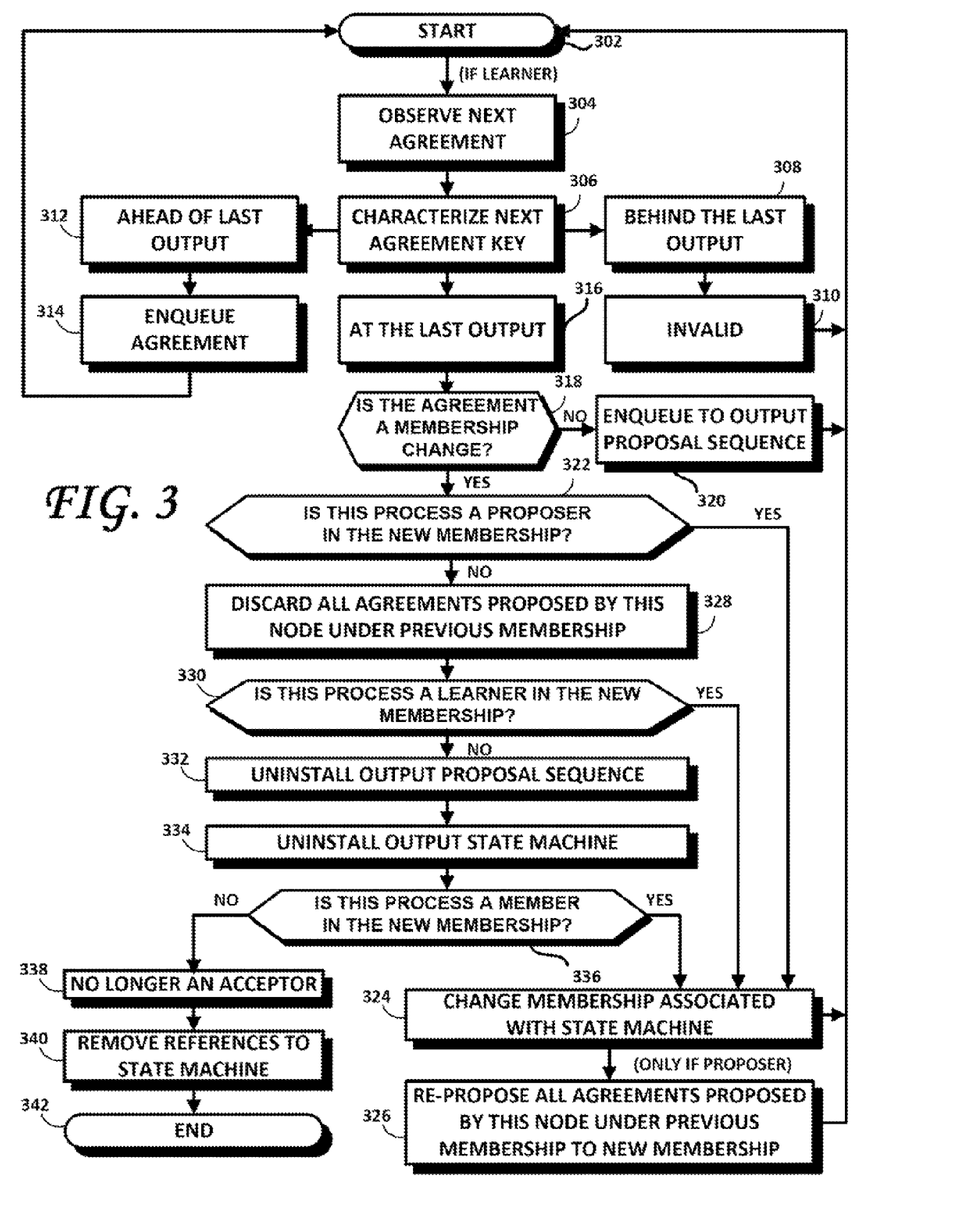
FIG. 3 is a flowchart illustrating dynamic membership changes, according to one embodiment.

This behavior is shown in FIG. 3, which extends FIG. 2 to include dynamic membership according to one embodiment. It is to be noted that logic enforces the requirement that, according to one embodiment, proposers must always be learners for dynamic membership to function correctly. A learner, as set forth above, learns of agreements made between the proposers and acceptors and applies the agreements in a deterministic order to the application through their output proposal sequence. In embodiments comprising a replicated software version control system, for example, learners may comprise those processes that are configured to host a replica of the software repositories managed by the system. As shown in FIG. 3, and assuming that the proposer of the agreement is a learner, the agreement handling process may begin at 302, whereupon the agreement handler may observe and characterize the next agreement (i.e., one of $\{a_1, \ldots, a_k\}$) at 304. The characterization may, according to one embodiment be based upon a comparison of the received agreement key k relative to the current agreement key or $k_{last\_output}$. If the received key k is behind the last output as shown at 308, it is de facto invalid as shown at 310, as being older than the current agreement key $k_{last\_output}$. If the received key k is ahead of the last output (greater than the current key $k_{last\_output}$), as shown at 312 it may be simply enqueued in the agreement sequence as shown at 314 until such time as the its key k is equal to the current key $k_{last\_output}$, whereupon it may be enqueued to the output proposal sequence. From 310 and 314, the process may then return to 302, to wait for the next agreement.

If however, the received key k is at the current key (k=$k_{last\_output}$) as shown at 316, a determination may, according to one embodiment, be made at 318 whether there has been a change in the membership. In other words, a determination may be made whether the membership under which the agreement being processed was made is the same membership as the current membership. If there has been no change in membership (NO branch of 318), the agreement may be enqueued to the state machine's output proposal sequence, as shown at 320. If there has, indeed, been a membership change (YES branch of 318), a determination may be made whether the process having proposed the agreement under consideration is a proposer in the new membership, as shown at 322. If the process having proposed this agreement is a proposer in the new membership (YES branch of 322), the membership has changed and the process is indeed a proposer in the new membership. Accordingly, as shown at 324, the membership associated with this state machine may be changed and, since this process or node is a proposer under this new membership, all agreements proposed by this node or process may be re-proposed (by the processes that proposed them under the old membership that are still proposers in the new membership) under the new membership, as shown at 326. The method may then revert to 302, to observe next agreements.

If, however, there has been a membership change and the process having proposed the agreement under consideration is not a proposer in the new membership (NO branch of 322), all agreements proposed by this node under the previous membership (which is different than the current, recently changed membership) are, according to one embodiment, discarded as shown at 328 as all of these agreements were proposed under a membership that is no longer the current membership. At 330, it may then be determined, after having determined that the process having proposed the agreement under consideration is not a proposer in the new membership, whether the process is a learner in the new membership. If the process or node is indeed a learner in the new membership, the membership associated with the state machine may be changed as shown at 324 and the method may then revert back to 302. Agreements previously proposed by this node are not re-proposed (at 326), as it has been established that this node is not a proposer under this new agreement. If the process having proposed the agreement being evaluated is not a learner in the new membership, the output proposal sequence may be, according to one embodiment, uninstalled as shown at 332, as the output proposal sequence was for a membership that is no longer the current membership. The corresponding outputs state machine may, therefore, also be uninstalled, as shown at 334.

At this stage, it is unknown whether the agreement was proposed by a process or node that is even a member of the new membership. Such may be determined at 336, and if the process is indeed a member in the new membership (YES branch of 336), meaning that the process having proposed this agreement is an acceptor in the new membership, the membership associated with this state machine may be changed to the new membership, as shown at 324. As this node is not a proposer in the new membership, its agreements are not re-proposed and the method may revert back to 302, to enable the node to process next agreements. If, however, the process having proposed the agreement being processed is not a member in the new membership, the process is not a proposer, not a learner and not an acceptor (recall that acceptors participate in deciding on the order of suggestions made by proposers) in the now-current membership as shown at 338, and all references to the state machine may be removed at 340. The method may end for this node as shown at 342, as this node has no role in the new membership.

Changing the Set of Processes Associated with the Replicated State Machine

The dynamic membership process, according to one embodiment, may be configured to enable membership changes where the role of the set of processes associated with the replicated state machine within the membership changes or the set of processes associated with the replicated state machine is reduced or enlarged. This may be necessary due to processes being removed from the system as they fail, are temporarily or permanently taken off-line and decommissioned, or as new processes are added to provide the distributed system with enhanced functionality, greater fault-tolerance or throughput. Therefore, when a membership change is observed, the observing process may be added or removed as an acceptor, added or removed as a proposer or added or removed as a learner or removed as a member in the new membership.

Recall that, according to one embodiment, a membership change is 'just another agreement' in the global sequence of agreements seen by a replicated state machine. Any proposer may, therefore, propose not only membership-unrelated agreements but also may propose agreements configured to change a membership using the same mechanism as is used to propose agreements and such a membership change may remove any process from the role of proposer. To implement such dynamic membership changes in replicated state machines deployed in process, according to one embodiment, any process in the role of proposer must also be a learner (that is, $\{\forall p \in P : p \in L\}$, where P corresponds to the set of proposers and L corresponds to the set of Learners), so that a proposing process may observe membership changes (if/when agreed) and take the appropriate action. However, note that, according to one embodiment, acceptors need not be learners or proposers and that learners need not be proposers.

Therefore, a membership suitable for use in dynamic memberships according to embodiments may comprise as a set of acceptors Ac, a set of P, and a set of learners, L (m={Ac, P, L}). As a process may take one or more roles, the number of processes in the membership is the number of unique processes in the groups (or, the cardinality of the intersection of the sets Ac, P and L, or |Ac ∩P∩L|.), and for a membership change to take place, there must be at least one proposer (thus, the set of proposers should never be empty, and P≠☐ must always be true). If no process within the membership were a proposer, there would be no process in the membership able to propose a change to the membership, as such changes, according to one embodiment, are handled as agreement proposals. Moreover, a membership with all learners or acceptors would not be useful, as processes in either or both roles would sit idle, not having any proposed agreements to accept or enqueue into an output proposal sequence.

Adding New Learners

Changing the membership to a membership containing a different set of learners is significant, as when a change in membership occurs, not only are processes assigned to new roles, but there is also a requirement to exchange and synchronize some state associated with that role—i.e., the current value of the output proposal sequence, $k_{last\_output}$, for that sequence of agreements made under that membership. This is necessary so that the output proposal sequence to be maintained by the new learners starts outputting agreements to the replicated state machine starting from the correct point in the global sequence (the agreement directly after the membership change that included these new processes as learners). It may also be necessary to synchronize the application state at the new learner with that of other learners. For example, in the case of a software version control system, the application state is the state of a replicated software repository. When a new replica of that software repository is required (i.e., a new learner is to be added to the membership), the state of software repository must also be synchronized together with the state of the replicated state machine used to coordinate changes.

Accordingly, a procedure according to an embodiment is set out below that associates a set of learners L' containing one or more new learners in membership m' to replicated state machine d when the membership of the replicated state machine is changed from m to m'.

Significantly, the procedure described below and according to one embodiment is non-blocking on the set of existing learners. That is, the new learners may be added to a set of processes without affecting the existing set, thereby providing continuous availability of the system, without interruption for the users thereof, while new learners are being added. This is a significant benefit for implementations using dynamic membership, such as a replicated software version control system, as users of the system working in one location will not be affected when, for instance, a new software repository site is added to the set of processes. According to one embodiment, there is only one point where one of the existing learners may be paused; that is, to synchronize any application state associated with the replicated state machine, such as file system data.

Procedure for Adding New Learners

According to one embodiment, a method for adding new learners to set of processes within a distributed computing system may comprise the following:

1. Assume a replicated state machine d is installed at all processes in membership m;
2. Assume membership m' containing a different set of learners L' is deployed at all processes in m'. Such membership may, for example, be deployed as shown and described above for the dynamic membership change deployment;
3. The replicated state machine d is deployed at all new learners (e.g., all learners in the set $\{\forall 1 \in L' : 1 \in L\}$) and d is associated to m' at those processes that are new learners. Note that all new learners do not need to know about memberships that do not include them, such as m, the membership associated to the replicated state machine prior to the membership change;
4. When d is deployed on this set of new learners, the replicated state machine is installed, according to an embodiment, in a disabled state. In this configuration, the replicated state machine's agreement handler can learn about agreements from the agreement engine but it will not, according to one embodiment, output agreements to the replicated state machine via the output proposal sequence. If the new learner also has the role of proposer in membership m', because the just-deployed replicated state machine d is in the disabled state, this new learner-proposer is not (yet) allowed to make proposals.
5. A membership change proposal is made by a process in membership m to membership m' to change the association of replicated state machine d to the new membership m'.
6. The membership change proposal becomes an agreement $a_k$ (i.e., with agreement identity <d, m, k>) in the global sequence of agreements for d under membership m.
7. When $a_k$ is processed at the correct point of the global sequence of agreements by the agreement handler at the nodes in m they change their association of the replicated state machine d to the new membership m' from m.
8. Immediately after observing the change of membership to a membership with new learners (i.e., where the number of learners in is greater than that in m (or, |L'|>|L|)), each process capable of proposing in m' (i.e., the proposers in the new membership m') issues a proposal to start the new learners that contains the value of the next available agreement key k, (i.e., staring from where the point in the output proposal sequence where their output should start);

Note: each proposer common to m and m' sets the desired agreement key of this start proposal to $k_{last\_output}+1$, which is the key after the change of membership that occurred at k. As each proposer common to m and m' issuing a proposal for the same agreement key, only the first proposal will 'win' this $k_{last\_output}+1^{th}$ slot in the global sequence of agreements for m' and, therefore, only one agreement will be made and seen by the new learners, even though it may be proposed multiple times;

9. Each new learner's agreement handler processes the start agreement with identity <d, m', k+1>, extracts the value of k+1 from the agreement and initializes $k_{last\_output}$ to k+1 and removes any enqueued agreements an agreement key k that is behind $k_{last\_output}+1$ ($k<k_{last\_output}$).
10. If there is no existing application state to be synchronized, the output proposal sequence of the new learners may be started and agreements from $k_{last\_output}+1$ delivered to the replicated state machine in sequential order.

In this manner, new learners may be synchronized to a common starting point and may now, going forward, enqueue agreements that are ahead of the now-synchronized last output, enqueue agreements that are at the last output to the output proposal sequence and invalidate agreements that are behind the last output, in the manner shown and described in FIG. 2. This does not, however, serve to deliver agreements from before $k_{last\_output}+1$ to the replicated state machine in sequential order. A manner of doing so, according to one embodiment, is described below.

Procedure for Helping New Learners Synchronize Application State

As described above, the replicated state machine d deployed on a set of new learners may have some application state associated therewith. For example, for a software version control system, the application state is the state of a replicated software repository managed by the system. When a new replica of that software repository is required, some mechanism is needed to synchronize this state while also maintaining the non-blocking behavior required for businesses to continue operating as usual. According to one embodiment, synchronizing the application state associated with a replicated state machine deployed on one or more new learners may comprise:

1. Following the completion of the process in the "Procedure for Adding New Learners" above, the new learners are in a position to synchronize their application state or to have their application state synchronized, as they cannot do so without help from at least one other learner;
2. Therefore, one or more of the learners from the old membership m may be chosen to help the new learners: H denotes this set of processes (each helper is in the set of processes $\{\forall h \in H: h \in L\}$—i.e., all helpers were learners in old membership m). According to one embodiment, more than one helper-learner may be specified as, in the case of a replicated software version control repository, the repository may be large (e.g., gigabytes) and require a significant amount of time to transfer to the new learners. Multiple helper learners may be allowed and beneficial so each new learner may be helped by a process (that is, a learner of the current membership m' that was also a learner in the old membership m that is chosen to help a new learner) that is spatially and/or geographically near to them, or coupled to them by a higher bandwidth connection, for example. This helps minimize network traffic and/or the time required to transfer the application state to the new learner.
3. A proposer (who is also a learner) in membership m' may then propose a StartHelping proposal to membership m' to inform the set of helpers H that they should help the new learners.
4. The agreement handler on each process in H may then process the StartHelping agreement at a position k' in the global sequence of agreements for replicated state machine d that is after position k (i.e., the StartHelping agreement has agreement identity $<d, m', k'>$ and $k'>k$) and disables its output proposal sequence. This means the replicated state machine d can continue to learn of agreements (enqueuing them as necessary) and make proposals if it is in the role of proposer in membership m', but it is no longer outputting agreements to the replicated state machine, which maintains the application state constant.
5. The application state of the new learner in the new membership m' may then be synchronized using, for example, an out-of-band transfer mechanism. For example, if a file system data is being synchronized, a file transfer may take place using a file transfer program such as, for example, rcp (a programmer tool that makes it easier to integrate independent software components) that sends the data over a network linking the new learner and designated helper. However, other on-line or offline mechanisms may be used to transfer the necessary application state to the new learner, such as peer-to-peer, Flash storage, CD-ROMs, tapes or other random access, sequential access, fixed or rotating media data carriers.
6. When the file transfer is complete, a proposer in m' may issue a proposal to ReEnable the processes in H and the new learners. This proposal, when agreed by a majority of acceptors in the new membership m', is given agreement identity $<d, m', k''>$ at a position k'' in the global sequence of agreements for replicated state machine d that is after position k' (or, $k''>k$).
7. The agreement handler on each process in H processes the ReEnable agreement at position k'' in the global sequence of agreements for state machine d and enables its output proposal sequence. From this point on, the replicated state machine d starts learning of agreements in sequential order from k' (and thus its application state is once again allowed to change) and catches up on the agreements it has missed since its output proposal sequence was paused in Step 4.
8. The agreement handler on each new learner process in m' processes the ReEnable agreement at position k'' in the global sequence of agreements for replicated state machine d (i.e., the ReEnable agreement has agreement identity $<d, m', k''>$ and $k''>k'$) and enables its output proposal sequence.
9. However, the application state transferred to the new learner in Step 5 was taken at step k' and the value $k_{last\_output}$ of the new learner's output proposal sequence is set to k+1 (the key of the agreement identity of the agreement immediately after the membership agreement took place). Therefore, agreements from k+1 to k' are not given to the output proposal sequence and only agreements from k' are applied to the replicated state machine so the new learner applies the agreements it has missed since k to replicated state machine d, thereby synchronizing the application state of learners that are new to the new membership m'.

Figure 4:
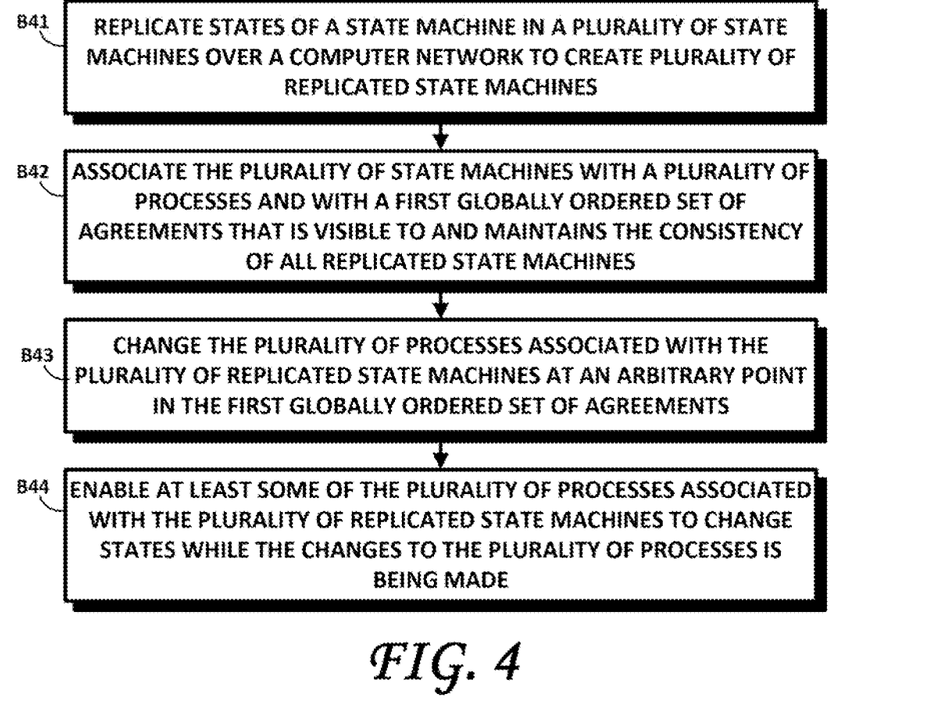
FIG. 4 is a flowchart of a method according to one embodiment.

FIG. 4 is a flowchart of a computer-implemented method according to one embodiment. As shown therein, block B41 calls for replicating states of a state machine in a plurality of state machines over a computer network to create a plurality of replicated state machines. As shown in block B42, the plurality of replicated state machines may be associated with a plurality of processes and with a first globally ordered set of agreements that is visible to and maintains a consistency of all replicated state machines. The plurality of processes associated with the plurality of replicated state machines, as shown at B43, may be changed at an arbitrary point in the first globally ordered set of agreements. This change, for example, may comprise adding or removing one of the plurality of processes to which the replicated state machines are associated changing a role of one or more of these processes or changing all of the processes with which the replicated state machines are associated. For example, the change may comprise changing the membership under which agreements are processed. As shown at B44, one or more of the plurality of processes associated with the plurality of replicated state machines may be enabled to change states while the change to the plurality of processes is being made. For example, learners may continue outputting agreements to replicated state machines while the role of one or more processes within the current membership is changed. That is, the system is not blocked while a membership change takes place.

Figure 5:
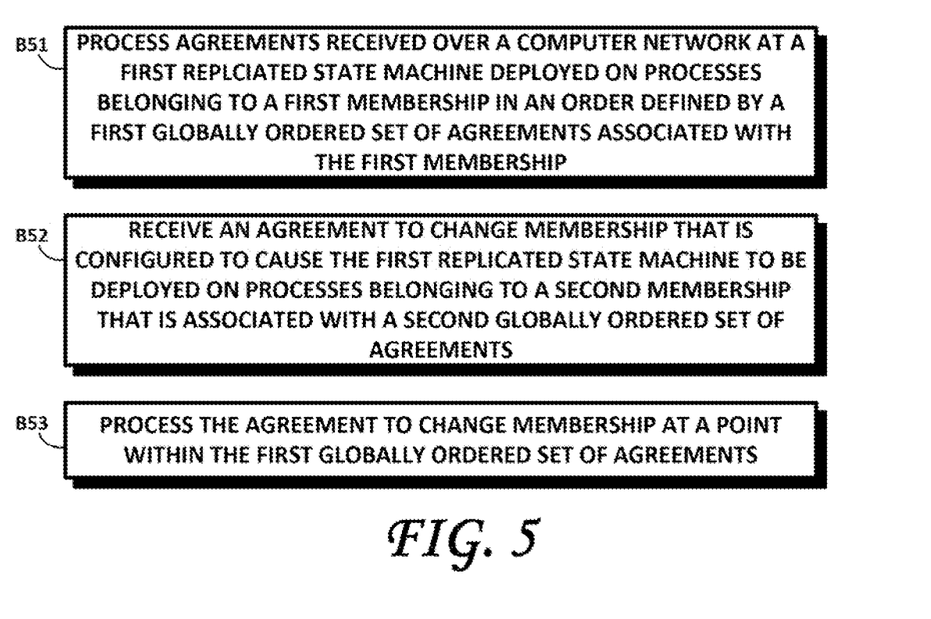
FIG. 5 is a flowchart of further aspects of a method according to one embodiment.

FIG. 5 is a flowchart showing further aspects of a computer-implemented method according to one embodiment. As shown at B51, agreements received over a computer network may be processed at a first replicated state machine deployed on processes belonging to a first membership. Such processing may be carried out in an order defined by a first globally ordered set of agreements that is associated with the first membership. Block B52 calls for receiving an agreement to change membership that is configured to cause the first replicated state machine to be deployed on processes belonging to a second membership that is associated with a second globally ordered set of agreements. As shown at B53, the agreement to change membership may be processed at a point (e.g., any arbitrary point) within the first globally ordered set of agreements.

According to embodiments, and with continued reference to FIG. 5, agreements may be received that are configured to be processed on processes belonging to the second membership while agreements are processed by processes belonging to the first membership, as a result of the asynchronous and out of order receipt of agreements. The received agreements to be processed on processes belonging to the second membership may be persistently stored (e.g., in a power-safe manner that does not lose data across power cycles) for processing after the agreement to change membership has been processed. The stored agreements to be processed on processes belonging to the second membership may thereafter be processed at a point (e.g., an arbitrary point) within the second globally ordered set of agreements. The agreements received at the replicated state machine deployed on processes belonging to the first membership may continue to be processed while the agreement to change memberships is being processed. Moreover, processes from the first membership may be added or removed while the received agreements are being processed at the replicated state machine deployed on other ones of the processes belonging to the first membership. The role of a process belonging to the first membership may also be changed while the received agreements are being processed at the replicated state machine deployed on other ones of the processes belonging to the first membership. For example, changing the role may comprise changing the role of the process to that of a proposer, acceptor and/or learner. Received agreements may be processed at a second replicated state machine deployed on processes belonging to the first membership in the order defined by the first globally ordered set of agreements associated with the first membership. In this manner, the first and second replicated state machines remain consistent as agreements are received asynchronously and out of order.

Advantageously, embodiments of the dynamic membership of a replicated state machine described and shown herein enable the collection of processes associated with the state machine to be changed at an arbitrary point in the global sequence of agreements seen by all replicas of state machine. Indeed, according to one embodiment, an agreement to perform a change in membership can take place at any point in the global sequence of agreements and processes in the system are not blocked from making progress (e.g., enqueuing agreements in their output proposal sequence and changing their application state) at any point.

As embodiments of the present dynamic membership methods and systems enable proposals to be proposed and agreed to at any point in the global sequence in agreements seen by the state machine and all replicas thereof, the system is thus maintained in an available state while membership changes take place. This is significant for enterprises, as embodiments provide business continuity by ensuring that critical business functions are continuously available to end-users, with no down-time for bringing new nodes on or offline and no down-time for changing roles of existing nodes. Consequently, embodiments also reduce the necessity for business continuity planning (i.e., scheduling down-time or maintenance periods and communicating such down-time and maintenance periods to end-users across the distributed computing environment). Productivity is also enhanced, as users can continue to be productive during such membership changes and while new nodes are brought online and have their application state synchronized or as existing nodes fail and replacement ones are brought online. Moreover, according to one embodiment, not only is dynamic membership in a distributed computing environment enabled, but so is the selective association of roles to the constituent nodes of such an environment.

Figure 6:
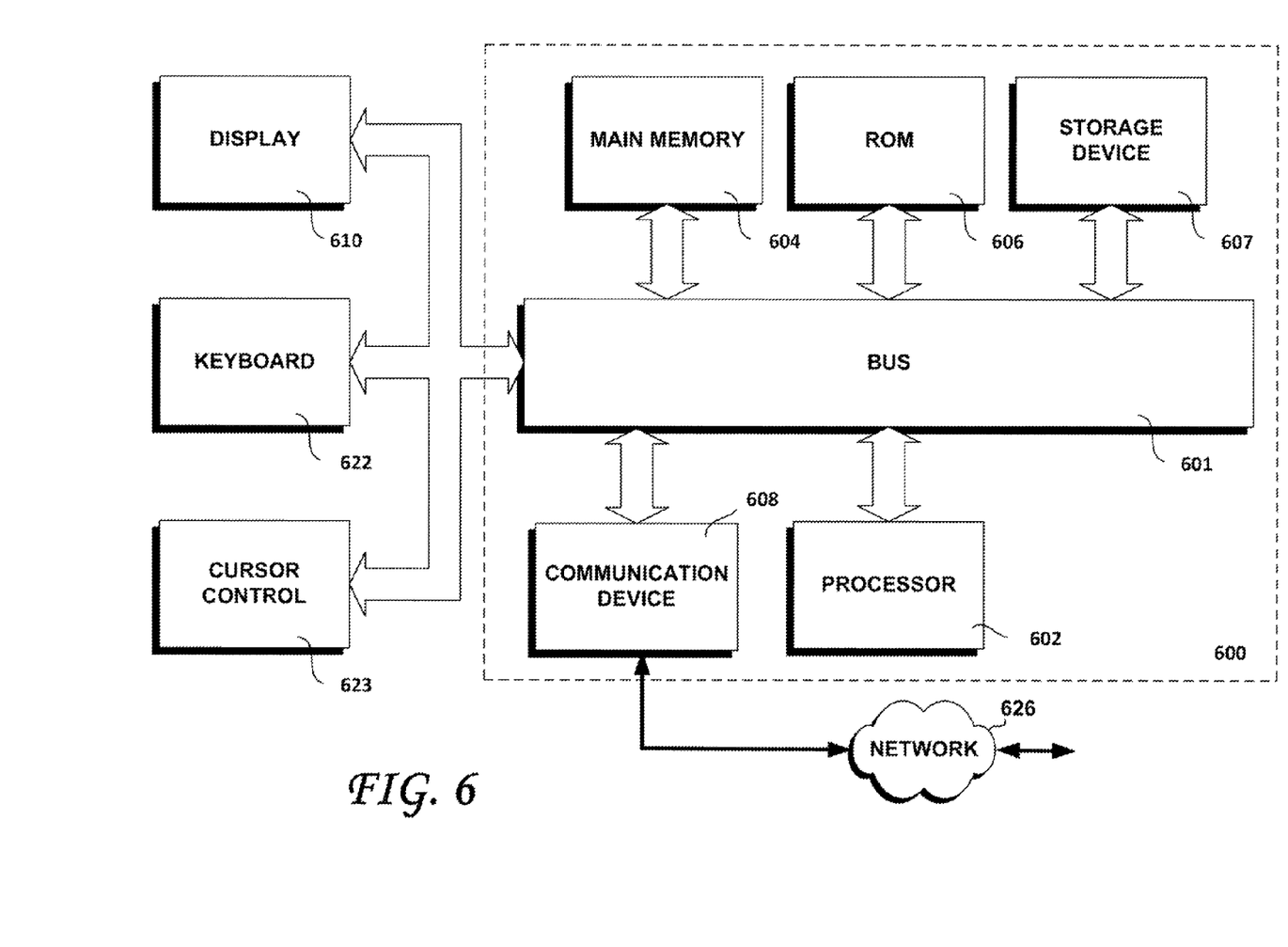
FIG. 6 is a block diagram of a computing device with which aspects of dynamic membership may be practiced, according to one embodiment.

FIG. 6 illustrates a block diagram of a computer system 600 upon which embodiments may be implemented. Computer system 600 may include a bus 601 or other communication mechanism for communicating information, and one or more processors 602 coupled with bus 601 for processing information. Computer system 600 further comprises a random access memory (RAM) or other dynamic storage device 604 (referred to as main memory), coupled to bus 601 for storing information and instructions to be executed by processor(s) 602. Main memory 604 also may be used for storing temporary variables or other intermediate information during execution of instructions by processor 602. Computer system 600 also may include a read only memory (ROM) and/or other static storage device 606 coupled to bus 601 for storing static information and instructions for processor 602. A data storage device 607 such as, for example, a magnetic disk or Flash memory, may be coupled to bus 601 for storing information and instructions. The computer system 600 may also be coupled via the bus 601 to a display device 610 for displaying information to a computer user. An alphanumeric input device 622, including alphanumeric and other keys, may be coupled to bus 601 for communicating information and command selections to processor(s) 602. Another type of user input device is cursor control 623, such as a mouse, a trackball, or cursor direction keys for communicating direction information and command selections to processor 602 and for controlling cursor movement on display 621. The computer system 600 may be coupled, via a communication device (e.g., modem, NIC) to a network 626 and to one or more nodes of a distributed computing system.

Embodiments are related to the use of computer system and/or to a plurality of such computer systems to create, deploy and dynamically change memberships in replicated state machines in a distributed computing system. According to one embodiment, the methods and systems described herein may be provided by one or more computer systems 600 in response to processor(s) 602 executing sequences of instructions contained in memory 604. Such instructions may be read into memory 604 from another computer-readable medium, such as data storage device 607. Execution of the sequences of instructions contained in memory 604 causes processor(s) 602 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method, comprising:
   processing agreements received over a computer network at a first replicated state machine deployed on processes belonging to a first membership in an order defined by a first globally ordered set of agreements associated with the first membership;
   receiving an agreement to change membership that is configured to cause the first replicated state machine to be deployed on processes belonging to a second membership that is associated with a second globally ordered set of agreements; and
   processing the agreement to change membership at a point within the first globally ordered set of agreements.

2. The computer-implemented method of claim 1, further comprising receiving agreements to be processed on processes belonging to the second membership while agreements are processed by processes belonging to the first membership.

3. The computer-implemented method of claim 2, further comprising persistently storing the receiving agreements to be processed on processes belonging to the second membership for processing after the agreement to change membership has been processed.

4. The computer-implemented method of claim 3, further comprising processing the stored agreements to be processed on processes belonging to the second membership at a point within the second globally ordered set of agreements.

5. The computer-implemented method of claim 2, further comprising processing received agreements at the replicated state machine deployed on processes belonging to the first membership while the agreement to change memberships is being processed.

6. The computer-implemented method of claim 2, further comprising one of adding processes to and removing processes from the first membership while the received agreements are being processed at the replicated state machine deployed on other ones of the processes belonging to the first membership.

7. The computer-implemented method of claim 2, further comprising changing a role of a process belonging to the first membership while the received agreements are being processed at the replicated state machine deployed on other ones of the processes belonging to the first membership.

8. The computer-implemented method of claim 7, wherein changing the role comprises changing the role of the process to one of proposer, acceptor and learner.

9. The computer-implemented method of claim 4, further comprising processing received agreements at a second replicated state machine deployed on processes belonging to the first membership in the order defined by the first globally ordered set of agreements associated with the first membership, wherein the first and second replicated state machines remain consistent as agreements are received asynchronously and out of order.

* * * * *